United States Patent Office 3,422,024
Patented Jan. 14, 1969

3,422,024
STRONTIUM AND BARIUM SUBSTITUTED LANTHANUM PHOSPHATE PHOSPHORS
William A. McAllister, Morristown, Pa., assignor to Westinghouse Electric Corporation, Pittsburgh, Pa., a corporation of Pennsylvania
No Drawing. Filed Feb. 3, 1966, Ser. No. 524,816
U.S. Cl. 252—301.4     4 Claims
Int. Cl. C09k 1/04

This invention relates to phosphor material and, more particularly, to phosphor material which efficiently generates visible radiations of varying colors.

Fluorescent lamps utilize phosphors which efficiently convert ultraviolet radiations of a wavelength of 254 nm. into visible radiations. Other types of discharge devices utilize phosphors which efficiently convert both short wavelength and long wavelength ultraviolet radiations (such as those having a wavelength of 254 and 365 nm.) into visible radiations. Phosphors which emit in the red region of the visible spectrum are particularly useful in discharge devices and can be blended with other phosphors in order to achieve a desired color for the discharge device. Phosphors which are excited by ultraviolet radiations to emit both in the short wavelength and long wavelength regions of the visible spectrum are particularly useful. In addition, phosphors which are excited by ultraviolet radiations to emit visible radiations both as a line emission and as a band emsission are particularly useful.

It is therefore an object of this invention to provide novel phosphor material which efficiently converts ultraviolet radiations into visible radiations.

It is a further object to provide phosphor material having an emission color which can be varied by varying the phosphor components, the relative gram-atom ratios of the phosphor components, and the firing conditions.

It is an additional object to provide phosphor material which emits visible radiations with a spectrum consisting of a series of lines or a combination of lines and a band.

Briefly these and other objects which will become apparent as the description proceeds, are achieved by providing a phosphor composition having a matrix consisting essentially of (lanthanum, X) phosphate activated by europium, wherein X is at least one alkaline-earth metal of the group consisting of strontium and barium. For best performance the europium activator is supplemented by lithium, preferably in equal gram-atom amounts. The emission color is varied by varying the amounts of the selected alkaline-earth (barium or strontium) employed relative to the lanthanum.

As a specific example for preparing the strontium-containing embodiment of the present phosphor, the following components are thoroughly mixed to form a raw mix: lanthanum oxide, ammonium dihydrogen phosphate, lithium carbonate, europium oxide, and strontium carbonate. For the barium-containing embodiment, barium carbonate is used instead of strontium carbonate. Alternately, the two alkaline-earths may be mixed together. For actual specific examples, reference is made to the following Table I. Other chemicals containing the essential matrix and activator materials are, of course, usable. The raw mix is fired at temperatures in the range 1100–1300° C., for example, in air, nitrogen or nitrogen-hydrogen mixtures for periods of up to several hours, two hours being preferred. The firing conditions, and particular alkaline-earth used, determined the emission color and crystal structure of the final product. The important gram-atom ratios and firing conditions are summarized in Table I. White oxides are used here as sources of europium and lanthanum, nitrates, oxalates and other salts are equally usable. Similarly phosphates other than the ammonium dihydrogen material are good sources of phosphate.

TABLE I

| Composition (moles) | | | | | Gram-atom ratio of alkaline-earth metal to lanthanum | Emission color for λ excitation | | Firing atmosphere |
|---|---|---|---|---|---|---|---|---|
| $La_2O_3$ | $NH_4H_2PO_4$ | $Li_2CO_3$ | $Eu_2O_3$ | Other | | 254 nm. | 365 nm. | |
| 0.465 | 1.0 | 0.05 | 0.05 | 0.07, $SrCO_3$ | 1:13.3 | Red | Orange-red | Air, $N_2$. |
| 0.30 | 1.0 | 0.05 | 0.05 | 0.40, $SrCO_3$ | | Red | do | Air, $N_2$. |
| 0.065 | 1.0 | 0.05 | 0.05 | 0.875, $SrCO_3$ | 6.7:1 | Blue-violet | Blue | $N_2+H_2$. |
| 0.15 | 1.0 | 0.05 | 0.05 | 0.70, $BaCO_3$ | 2.34:1 | Red | Orange-red | Air, $N_2$. |
| 0.465 | 1.0 | 0.05 | 0.05 | 0.07, $BaCO_3$ | 1:13.3 | Red | Blue | $N_2+H_2$. |

The color of the light emitted by the resulting phosphor may be varied by varying the gram-atom ratio between the strontium (or barium) matrix component and the lanthanum matrix component. U.S. Patent No. 3,211,666, dated Oct. 12, 1965 describes a lanthanum phosphate phosphor having a long wavelength emission color which can be varied somewhat by the selection of the activator and the concentration thereof used. In the present phospor the emission color is varied by varying the strontium or barium proportions relative to the lanthanum. At low concentrations of strontium (1 Sr:13.3 La) the emission color is red and orange-red respectively under 254 and 365 nm. excitation. At high concentrations of strontium (6.7 Sr:1 La), the air and/or nitrogen firings also give red emission under both long and short ultraviolet excitation. Introduction of hydrogen into the firing atmosphere changes the emission of the resulting phosphor to blue violet and blue. The response to 365 nm. exitation is excellent.

In the barium-containing embodiment, for high Ba concentrations (2.34 Ba:1 La), the air and/or nitrogen fired phosphors also emit in the red and orange-red respectively under 254 and 365 nm. excitation wavelengths. With Ba:La=1.13:3, air and/or nitrogen firing results in a red-emitting phosphor. Addition of hydrogen to the nitrogen enhances the 254 nm. excited red emission and also results in a blue band emission for 365 nm. excitation. Under simultaneous excitation by both 254 nm. and 365 nm., a composite red-line and blue band emission is obtained.

The ranges of gram-atom ratios of the total alkaline-earth metal to the phosphorus in the phosphor are:

$$0.05 < Sr/P < 0.875$$

and $$0.05 < Ba/P < 0.7$$

At all concentrations of alkaline-earth, the sum of the gram-atom of alkaline-earths plus lanthanum is approximately equal to the gram-atoms of phosphorus, that is, $$\frac{X \text{ (total } Ba+Sr) + La}{P} \simeq 1$$

The emission of the phosphor includes a blue band when the phosphor is excited by long wavelength ultraviolet radiations, or when the phosphor is excited by a wide range of ultraviolet radiations which include long wavelength ultraviolet radiations, when the raw mix is fired in a slightly reducing atmosphere, and when:

$$0.8 < Sr/P < 0.875$$

and $$0.05 < Ba/P < 0.1$$

As an example, suitable slightly reducing firing atmospheres are a mixture of nitrogen with from 0.25% to 5% by volume of hydrogen added thereto. The amount of hydrogen used in the firing atmosphere can be varied from the foregoing example. The blue band emission is attributed to a reduction of some of the europium activator to the lower valence state.

Good phosphors can be obtained with other activator concentrations than those shown, e.g.

$$0.01 < Eu/P < 0.24$$

and $$0 < Li/P < 0.24$$

The red emission of $(La, Ba)PO_4$:Eu, Li under 254 nm. excitation is comparable to the corresponding $LaPO_4$:Eu, Li described in Patent No. 3,211,666. The blue emission of $(La, Ba) PO_4$:Eu, Li under 365 nm. excitation is better than the corresponding emission of $CaSiO_3$:Ce and approaches the emission of ZnS:Ag in brightness.

The best results occur when the europium and lithium activators are present in about equal gram-atom amounts. The preferred gram-atom ratio of Eu to the phosphorus in the phosphor is 0.1:1. As the gram-atoms of La decrease, the gram-atoms of alkaline-earth metal are increased to keep the gram-atom ratios of Sr+Ba+La/P equal to about 1.00.

After firing, the prepared phosphor is crushed into small particles. Refiring may be desirable to further the activation process or to increase the particle size of the phosphor crystals produced during firing.

When coating the phosphor onto lamp bulbs, it is desirable to limit the lehring temperatures which are normally required to volatilize organic binder materials. The phosphor of the present invention can readily be coated onto the lamp bulb by means of an electrostatic coating process, thereby precluding the necessity of using an organic binder material. With such a coating process, the maximum temperature to which the phosphor is exposed during lamp fabrication need not exceed about 450° C.

It will be recognized that the objects of the invention have been achieved by providing novel phosphor material which efficiently converts ultraviolet radiations into visible light. The color of the visible light is determined by the alkaline-earth used, and the relative amounts thereof to the phosphorus. A blue emission band may be achieved by firing the phosphor under slightly reducing conditions. In addition, the blue band may be provided to supplement the red emission spectrum.

Although this invention has been described with respect to preferred embodiments thereof, it is not to be so limited as changes and modifications may be made therein which are within the intended scope of the invention.

I claim as my invention:

1. A phosphor composition having a matrix consisting essentially of (lanthanum, X) phosphate, wherein X is at least one metal of the group consisting of strontium and barium, said matrix is activated by one of the group consisting of europium and europium plus lithium, and the ratio of metallic elements in said phosphor to phosphorus in said phosphor fall within the following gram-atom ranges:

$$0.01 < \frac{Eu}{P} < 0.24$$

$$0 < \frac{Li}{P} < 0.24$$

$$0.05 < \frac{Sr}{P} < 0.875$$

$$0.05 < \frac{Ba}{P} < 0.7$$

and $$\frac{X + La}{P} \simeq 1$$

2. The phosphor as specified in claim 1, wherein said europium and said lithium are present in about equal gram-atom amounts.

3. The phosphor as specified in claim 2, wherein the gram-atom ratio of europium plus lithium to phosphorus in said phosphor is about 0.2:1.

4. The phosphor as specified in claim 1 wherein said phosphor emits short wavelength visible radiations in response to excitation by a wide range of ultraviolet radiations, the ratio of metallic elements to phosphorus in said phosphor fall within the following gram-atom ranges:

$$0.8 < Sr/P < 0.875$$
$$0.05 < Ba/P < 0.1$$

and said phosphor is prepared by firing the phosphor raw mix in a slightly reducing atmosphere.

References Cited

UNITED STATES PATENTS 3,211,666  10/1965  McAllister _____ 252—301.4

FOREIGN PATENTS 1,419,231  10/1965  France.

TOBIAS E. LEVOW, *Primary Examiner.*

R. D. EDMONDS, *Assistant Examiner.*